US011435997B2

(12) United States Patent
Haryadi et al.

(10) Patent No.: US 11,435,997 B2
(45) Date of Patent: *Sep. 6, 2022

(54) DESIRED STATE MODEL FOR MANAGING LIFECYCLE OF VIRTUALIZATION SOFTWARE INSTALLED IN HETEROGENEOUS CLUSTER OF HOSTS

(71) Applicant: VMware, Inc., Palo Alto, CA (US)

(72) Inventors: Aravinda Haryadi, Bangalore (IN); Mukund Gunti, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/116,774

(22) Filed: Dec. 9, 2020

(65) Prior Publication Data

US 2022/0179633 A1  Jun. 9, 2022

(51) Int. Cl.
  *G06F 8/61* (2018.01)
  *G06F 9/455* (2018.01)

(52) U.S. Cl.
  CPC ............ *G06F 8/63* (2013.01); *G06F 9/45529* (2013.01)

(58) Field of Classification Search
  CPC ..... G06F 8/63; G06F 8/65; G06F 8/71; G06F 9/45516
  See application file for complete search history.

(56) References Cited

U.S. PATENT DOCUMENTS

| 9,047,160 | B2* | 6/2015 | Adi ........................... G06F 8/63 |
| 9,792,141 | B1* | 10/2017 | Sethuramalingam ..... G06F 8/63 |
| 11,269,609 | B2* | 3/2022 | Haryadi ............... G06F 9/45558 |
| 2002/0108033 | A1* | 8/2002 | Kroening ................. G06F 8/658 |
| | | | 713/1 |
| 2002/0156877 | A1* | 10/2002 | Lu ............................. G06F 8/63 |
| | | | 709/221 |
| 2003/0231188 | A1* | 12/2003 | Cohen ....................... G06F 8/63 |
| | | | 345/629 |
| 2008/0059782 | A1* | 3/2008 | Kruse ....................... G06F 8/63 |
| | | | 713/1 |

(Continued)

OTHER PUBLICATIONS

Agarwal et al., "An architecture for elastic resource allocation in Fog Computing", 2015, IJCSC, vol. 2 No. 2, pp. 201-207 (Year: 2015 ).*

(Continued)

*Primary Examiner* — Wei Y Zhen
*Assistant Examiner* — Junchun Wu
(74) *Attorney, Agent, or Firm* — Kim & Stewart LLP

(57) ABSTRACT

A method of installing an image of a virtualization software installing an image of a virtualization software in a heterogeneous duster of hosts that include first hosts having server hardware of a first type and at least one second host having server hardware of a second type, includes: in response to a user input, generating a software specification that specifies a base image of the virtualization software and an add-on image of the virtualization software; retrieving metadata of the base image and metadata of add-on image; generating first and second desired images of the virtualization software, which are to be applied respectively to the first hosts and the at least one second host, based on the metadata of the base image and metadata of the add-on image; and instructing each of the first and second hosts to install a desired image of the virtualization software therein.

12 Claims, 9 Drawing Sheets

(56) References Cited

U.S. PATENT DOCUMENTS

| | | | |
|---|---|---|---|
| 2009/0043890 A1* | 2/2009 | Noonan, III | G06Q 10/00 |
| | | | 709/225 |
| 2011/0161952 A1* | 6/2011 | Poddar | G06F 9/455 |
| | | | 718/1 |
| 2012/0054743 A1* | 3/2012 | Fujiwara | G06F 8/63 |
| | | | 718/1 |
| 2012/0084769 A1* | 4/2012 | Adi | G06F 8/63 |
| | | | 717/174 |
| 2014/0108774 A1* | 4/2014 | Bennah | G06F 11/3051 |
| | | | 713/2 |
| 2015/0244802 A1* | 8/2015 | Simoncelli | G06F 9/45558 |
| | | | 709/219 |
| 2017/0180346 A1* | 6/2017 | Suarez | G06F 21/53 |
| 2017/0249127 A1* | 8/2017 | Parees | G06F 8/71 |
| 2018/0024850 A1* | 1/2018 | Caro Estevez | G06F 16/2246 |
| | | | 718/1 |
| 2020/0310775 A1* | 10/2020 | Nyamars | G06Q 20/382 |
| 2021/0311711 A1* | 10/2021 | Haryadi | G06F 9/4411 |

OTHER PUBLICATIONS

Garcia-Valls et al., "Analyzing point-to-point DDS communication over desktop virtualization software", 2016, Elsevier B.V. (Year: 2016).*

Ribi'ere, "Emulation of Obsolete Hardware in Open Source Virtualization Software", 2010, IEEE (Year: 2010).*

Ferger t al., "Hardware / Software Virtualization for the Reconfigurable Multicore Platform", 2012, IEEE (Year: 2012).*

Chen et al., "Virtual Machine Image Content Aware I/O Optimization for Mobile Virtualization", 2015, IEEE (Year: 2015).*

* cited by examiner

DESIRED STATE MODEL FOR MANAGING LIFECYCLE OF VIRTUALIZATION SOFTWARE INSTALLED IN HETEROGENEOUS CLUSTER OF HOSTS

BACKGROUND

In many virtualization computing systems, virtualization software is installed on a cluster of hosts using an ISO image that is created from a flat list of software installation bundles (SIBs). An SIB is the smallest unit of software that can be shipped and installed, and these SIBs make up, for example, a base hypervisor image (hereinafter also referred to as "base image") from a virtualization software provider, as well as drivers, agents, and other software components from an OEM (original equipment manufacturer) and other vendors of hardware. In a typical installation, hundreds of these SIBs are packaged as one or more ISO images and installed in the hosts.

After installation, lifecycle management of the virtualization software becomes cumbersome and error-prone for several reasons. First, although different software developers create new versions or updates to the SIBs, the new versions or updates cannot be released independently. The releases have to be tightly controlled because it is likely that one SIB has a dependency to another SIB. As a result, new releases are made in the form of bulletins, which are a collection of software installation bundles, or as a new ISO image in which new SIBs from the virtualization software provider, the OEM, and other software vendors are packaged. Because of the inter-dependencies and the integration of the newly developed SIBs with other SIBs, it is difficult to make piecemeal changes to the virtualization software for easy consumption by an end user during the lifecycle of the virtualization software.

Furthermore, new releases come in many different forms. A complete release, e.g., a GA (general availability) release, may be made with an ISO image or a bulletin. The bulletin may be employed for partial releases as well, including rollup, patch, update, and extension. Very few end users understand the differences among these different types of partial releases and there are no clear rules that establish when and how a bulletin should be created for a particular type of release.

Consequently, over time, changes to the virtualization software are layered on top of each other and the final image of the virtualization software is not easily captured or described. Worse, hi story becomes a factor in that past bulletins may have included other SIBs, not overridden in later bulletins. For these reasons, the overall content is difficult to capture or describe, and the end user is unable to answer the question, "What is the current state of the virtualization software configured in each of the hosts in the cluster?" As such, if there is a particular desired state of the virtualization software that the user is interested in, the end user will have no way of knowing whether the current state is compliant with the desired state and, if not, how to make the current state compliant with the desired state.

SUMMARY

One or more embodiments provide a desired state model for managing the lifecycle of virtualization software. According to embodiments, components of virtualization software are grouped into release units that are each managed separately and are layered on top of each other in a standardized way so that developers can independently create and ship their software with proper naming and versioning for easy consumption by end users of the virtualization software.

In this desired state model, the virtualization software provider releases the base image which forms the foundation for everything. OEMs create add-ons that customize the base image for their servers. When the end user selects an OEM of the servers for hosting the virtualization software, the add-on for that OEM is layered on top of the base image. In addition, a firmware manifest is laid on top of the add-on. At the top are additional drivers and agents, e.g., those added in response to a user selection of solutions.

According to one embodiment, an image of a virtualization software is installed in a heterogeneous cluster of hosts, the heterogeneous cluster of hosts including first hosts having server hardware of a first type and at least one second host having server hardware of a second type. The method of installing the image of the virtualization software in the heterogeneous cluster of hosts includes the steps of: in response to a user input, generating a software specification that specifies a base image of the virtualization software and an add-on image of the virtualization software; retrieving metadata of the base image and metadata of the add-on image; generating a first desired image of the virtualization software based on the metadata of the base image and the metadata of the add-on image and a second desired image of the virtualization software based on the metadata of the base image and the metadata of the add-on image, wherein the first desired image is to be applied to one or more of the hosts having server hardware of the first type and the second desired image is to be applied to one or more of the hosts having server hardware of the second type; and instructing each of the first and second hosts to install a desired image of the virtualization software therein.

Further embodiments include a non-transitory computer-readable storage medium comprising instructions that cause a computer system to carry out the above method, as well as a computer system configured to carry out the above method.

DETAILED DESCRIPTION

According to embodiments, SIBs, more generally referred to herein as payloads, are logically grouped into "components." In the embodiments, a component is a unit of shipment and installation, and a successful installation of a component typically will appear to the end user as enabling some specific feature. For example, if a software vendor wants to ship a user-visible feature that requires a plug-in, a driver, and a solution, the software vendor will create separate payloads for each of the plug-in, the driver, and the solution, and then group them together as one component. From the end user's perspective, it is sufficient to install this one component onto a server to enable this feature on the server. A component may be part of another software image, such as a base image or an add-on, as further described below, or it may be a stand-alone component provided by a third-party or the end user (hereinafter referred to as "user component").

A "base image" is a collection of components that are sufficient to boot up a server with the virtualization software. For example, the components for the base image includes a core kernel component and components for basic drivers and in-box drivers. The core kernel component is made up of a kernel payload and other payloads that have inter-dependencies with the kernel payload. According to embodiments, the collection of components that make up the base image is packaged and released as one unit.

An "add-on" or "add-on image" is a collection of components that the OEM wants to bring together to customize its servers. Using add-ons, the OEM can add, update or remove components that are present in the base image. The add-on is layered on top of the base image and the combination includes all the drivers and solutions that are necessary to customize, boot up and monitor the OEM's servers. Although an "add-on" is always layered on top of a base image, the add-on content and the base image content are not tied together. As a result, an OEM is able to independently manage the lifecycle of its releases. In addition, end users can update the add-on content and the base image content independently of each other.

"Solutions" are features that indirectly impact the desired image when they are enabled by the end user. In other words, the end-user decides to enable the solution in a user interface but does not decide what components to install. The solution's management layer decides the right set of components based on constraints. Examples solutions include HA (high availability), and NSX (network virtualization platform of VMware, Inc.).

Figure 1:
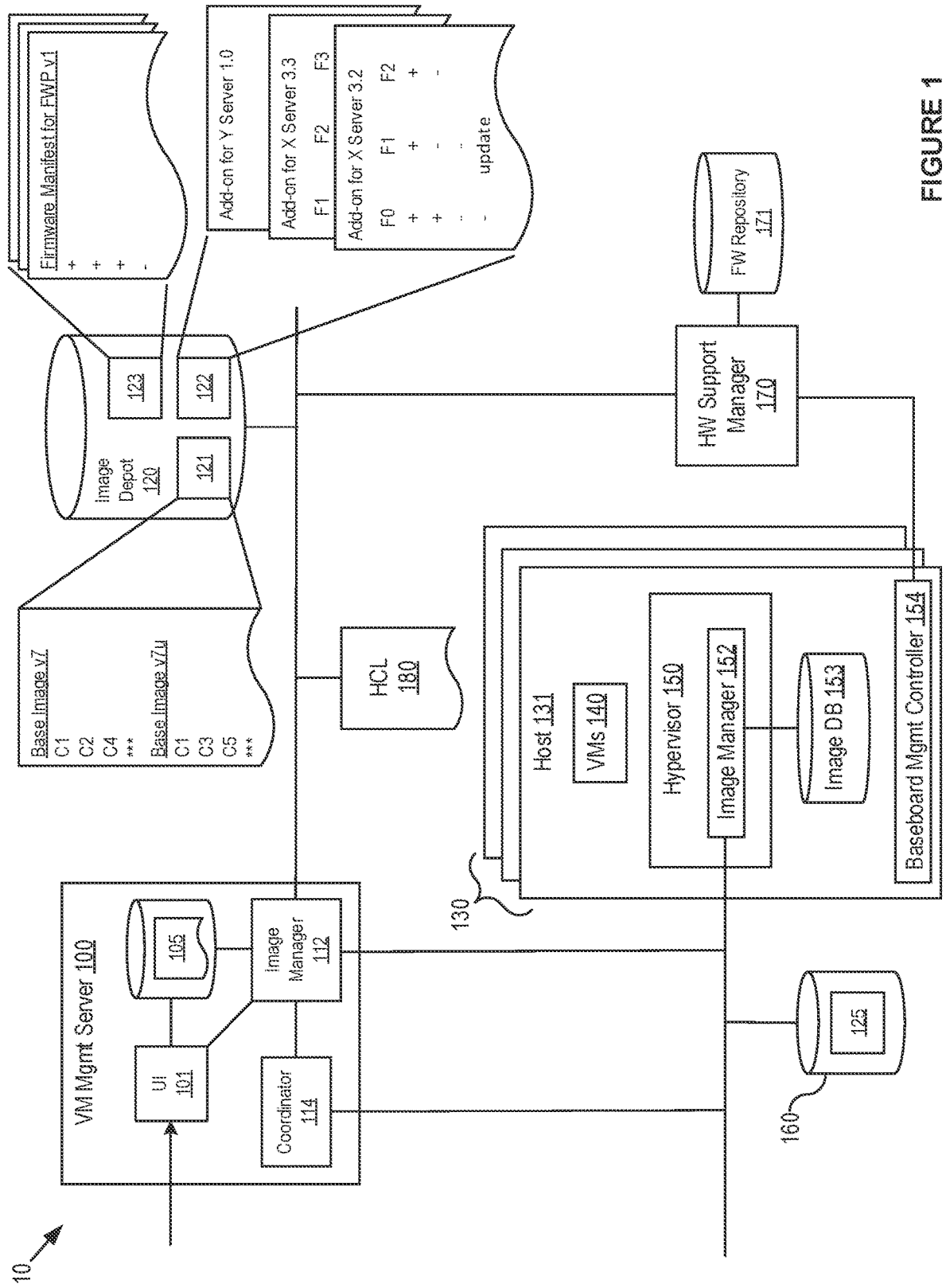
FIG. 1 is a block diagram of a virtualized computing system that implements a desired state model for managing the lifecycle of virtualization software according to embodiments.

FIG. 1 is a block diagram of a virtualized computing system 10 that implements a desired state model for managing the lifecycle of virtualization software according to embodiments. System 10 includes a cluster of hosts 131 which may be constructed on a server grade hardware platform such as an x86 architecture platform. The hardware platform includes one or more central processing units (CPUs), system memory, e.g., random access memory (RAM), and one or more network interface controllers (NICs). A virtualization software layer, also referred to herein as a hypervisor 150, is installed on top of the hardware platform. Hypervisor 150 supports a virtual machine execution space within which multiple VMs 140 may be concurrently instantiated and executed.

In the embodiment illustrated in FIG. 1, hosts 131 access shared storage 160 through their NICs. In another embodiment, each host 131 contains a host bus adapter (HBA) through which input/output operations (IOs) are sent to shared storage 160. Shared storage 160 may comprise, e.g., magnetic disks or flash memory in a storage area network (SAN). In some embodiments, hosts 131 also contain local storage devices (e.g., hard disk drives or solid-state drives), which may be aggregated and provisioned as a virtual SAN device.

VM management server 100 is a physical or virtual server that communicates with hypervisor 150 of each host 131 to provision VMs 140 from the hardware resources of host 131. VM management server 100 logically groups hosts 131 into a cluster 130 to provide cluster-level functions, such as load balancing across cluster 130 by performing VM migration between hosts 131, distributed power management, dynamic VM placement according to affinity and anti-affinity rules, and high-availability. The number of hosts 131 in the cluster may be one or many and three are depicted in FIG. 1.

In the desired state model according to embodiments, the end user expresses the desired state of the virtualization software (i.e., hypervisor 150) for the cluster of hosts through a UI 101 of VM management server 100. One example form for expressing the desired state is a software specification 105, which is generated based on selections made through UI 101. The selections that can be made through UI 101 include (1) base image, (2) add-on, (3) solution, (4) user component(s), and (5) firmware package (see FIG. 2). Image manager 112 consumes software specification 105 to composite a desired image that is modeled as a hierarchical software stack, including (1) the base image, which is the lowest layer of the software stack, (2) the add-on, which is layered on top of the base image, (3) firmware manifest corresponding to the selected firmware package in the layer above the add-on, and then on the top (4) solution drivers and agents and other user components.

In the embodiments, metadata and payloads of components, and metadata of base images, add-ons, firmware packages (in the form of a firmware manifest 123), components defined in firmware packages (hereinafter referred to a "firmware components"), and user components are placed in a data structure referred to as image depot 120. As depicted in FIG. 1, metadata 121 for base images include metadata for "Base Image v7," which include components, C1, C2, C4, etc. and metadata for "Base Image v7u," which include components, C1, C3, C5, etc. FIG. 1 also depicts metadata 122 for add-ons for a family of servers, F1, F2, and F3, where the "+" symbols represent components being added to the base image and the "−" symbols represent components being deleted from the base image, while "update" represents a component in the base image that is being updated. As shown in metadata 122, for each family of servers, there can be different components that are added to, deleted from, and/or updated in the base image. Thus, different add-ons can have different dependencies. Firmware manifest 123 specifies components that are to be added on top of the base image and the add-on (depicted with a + symbol in FIG. 1) and components that are to be removed from the base image and the add-on (depicted with a − symbol in FIG. 1), so that drivers, agents, and other software components corresponding to the selected firmware package become part of the image of the virtualization software. In alternative embodiments, separate depots, e.g., in the form of file servers, are set up by OEMs to store metadata and payloads of components that the OEMs publish.

Figure 4:
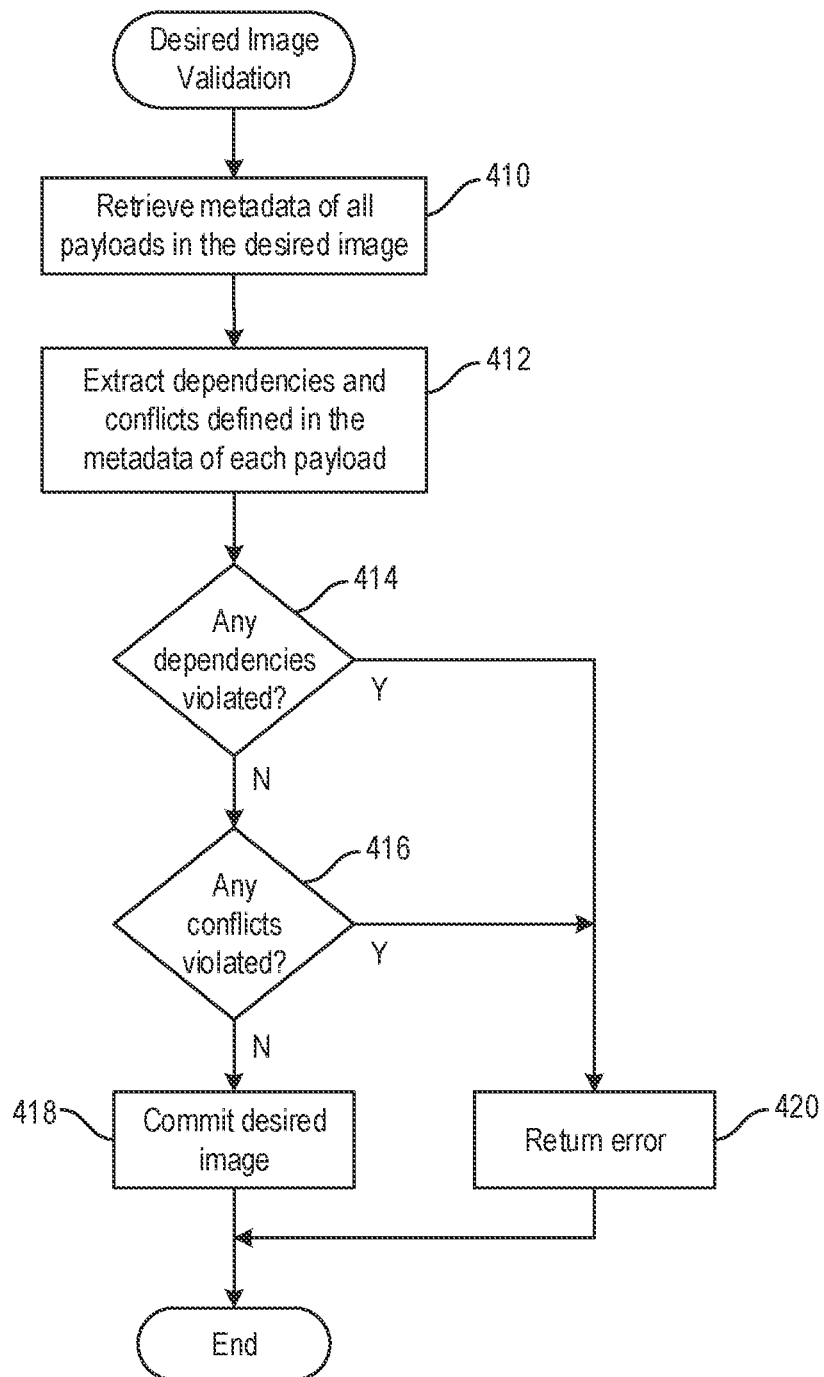
FIG. 4 is a flow diagram of steps carried out to perform validation of the desired image, according to an embodiment.

After image manager 112 composites the image of the virtualization software, image manager 112 validates the composited image in accordance with the method depicted in FIG. 4 and, if validated, stores the composited image in shared storage 160 as a desired image 125 that is to be installed in each host 131, and hands off control to coordinator 114. Coordinator 114 communicates with image manager 152 of each of hosts 131 through an API call to install desired image 125 in each of hosts 131. Once image manager 152 installs desired image 125, it stores the metadata of the installed image of the virtualization software in image database 153. Going forward, image database 153 of each host 131 operates as the single source of truth for the state of the virtualization software configured in that host, and will record any changes to the state of the virtualization software in image database 153.

Coordinator 114 also communicates with a hardware support manager 170 through an API call to install the firmware in hosts 131. In response to the API call, hardware support manager 170 retrieves the firmware from firmware repository 171 and stages the firmware in hosts 131. Then, the firmware staged in each host 131 is installed in the host by a corresponding baseboard management controller 154.

Hardware support manager 170 is a firmware management software running in a physical or a virtual server that exposes various APIs. The APIs include: (1) an "apply/remediate" API call to install in hosts 131 the firmware specified by the firmware manifest in desired image 125 or to remediate the firmware currently installed in hosts 131 to bring the firmware into compliance, (2) a "list" API to list all of the firmware packages that hardware support manager 170 is supporting, (3) a "scan" API to compare the current state of the firmware running in hosts 131 with the firmware specified by the firmware manifest in desired image 125, (4) a "firmware inventory" API to report a current state of the firmware running in hosts 131, (5) a "pre-check" API to confirm that it is possible to upgrade the firmware currently installed in hosts 131 to the firmware specified by the firmware manifest in desired image 125, and (6) a "stage" API to retrieve the firmware specified by the firmware manifest in desired image 125 and store them in a cache memory of hosts 131 for immediate installation upon receiving an apply or remediate API With these APIs, the end user is able to manage the image of the virtualization software installed in hosts 131 and the firmware installed in hosts 131 from a single "pane of glass," in this case, through UI 101 of VM management server 100.

Before desired image 125 is actually installed in hosts 131, image manager 112 performs a validation against a hardware compatibility list (HCL) 180. The goal of this validation, more specifically referred to herein as an HCL validation, is to make sure that desired image 125 which is going to be deployed in hosts 131 is compatible with the hardware devices in hosts 131. HCL 180 contains a list of all hardware devices installed in hosts 131, and identifies for each such hardware device all versions of device firmware and drivers that are compatible therewith. Validation is successful if the versions of the firmware and drivers in desired image 125 are listed in HCL 180 as compatible versions.

Figure 2:
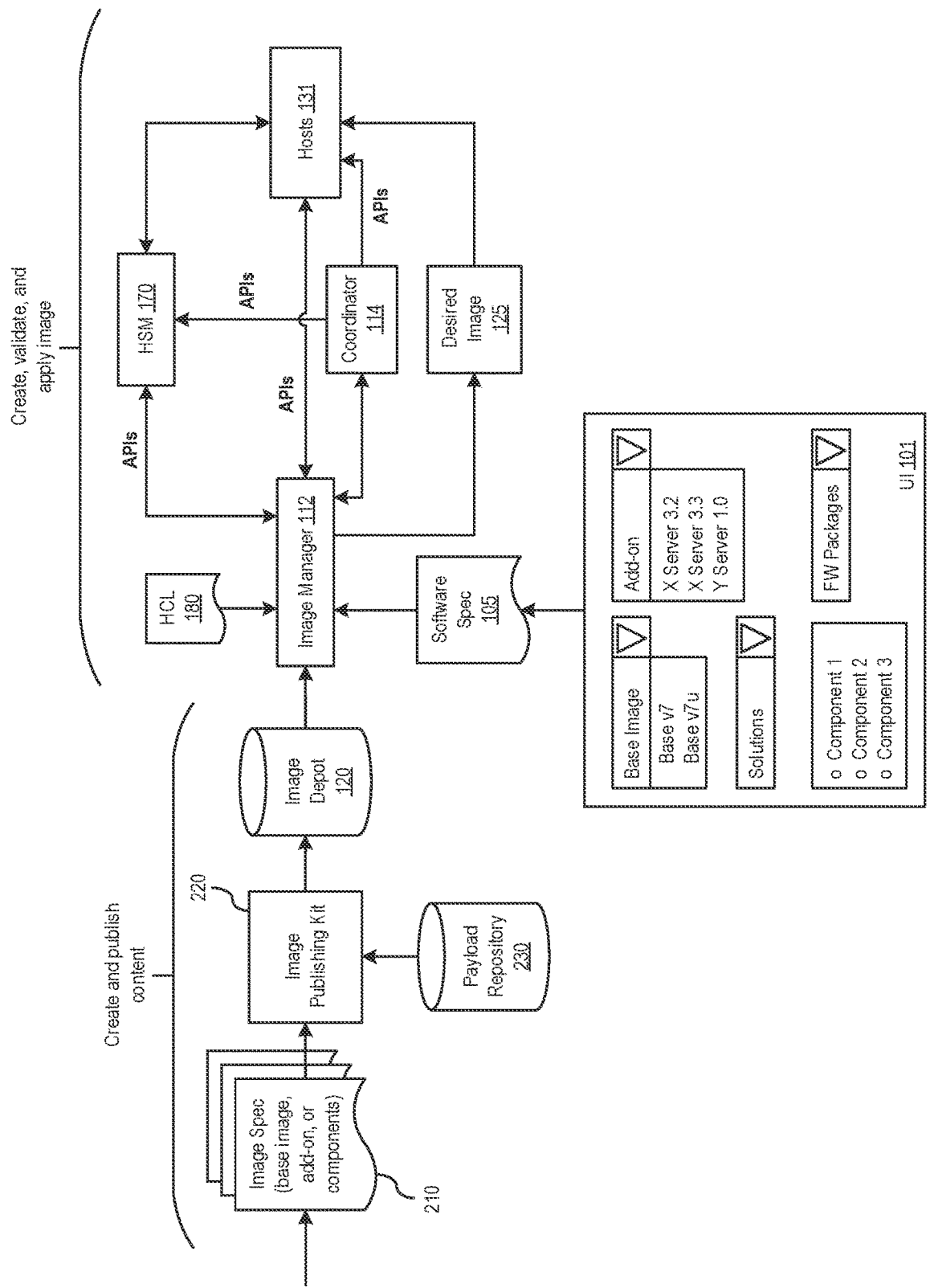
FIG. 2 is a conceptual diagram that illustrates a flow of steps carried out by different components of the virtualized computing system to create and apply a desired image of the virtualization software, according to embodiments.

FIG. 2 is a conceptual diagram that illustrates a flow of steps carried out by different components of the virtualized computing system to create and apply a desired image of the virtualization software, according to embodiments. The first part of FIG. 2 depicts steps for creating content and publishing them in image depot 120. Typically, the creator of the base image is the provider of the virtualization software, e.g., VMware, Inc., and the creator of the add-on is the OEM, which is the provider of the physical servers that are configured as hosts 131. The creator of components may be the provider of the virtualization software, the OEM, or another software developer (e.g., in the case of user components).

Components are defined in an image specification 210 as a collection of payloads, which are stored in payload repository 230, and an image publishing kit 220 pulls in the payloads of the components from payload repository 230 and publishes them in image depot 120 along with the metadata of the published components. Components published in this manner may be a component of a base image, a component of an add-on, a firmware component, a component required to implement a solution, or a user component.

The provider of the virtualization software defines the components that make up the base image in an image specification 210, and image publishing kit 220 publishes the metadata of the base image in image depot 120. In the example depicted in FIG. 1, the metadata of the base image for "Base v7" and the metadata of the base image for "Base v7u" are published in image depot 120.

OEMs define the content of their add-ons in image specifications 210, and image publishing kit 220 publishes the metadata of the add-ons in image depot 120. In the example depicted in FIG. 1, the metadata of add-ons for a family of servers (e.g., F1, F2, and F3 of Server 3.0) are published in image depot 120. OEMs also define the content of firmware components, and image publishing kit 220 publishes the metadata of these components in image depot 120. OEMs also define the content of their firmware packages, in the form of a firmware manifest.

Different solutions and user components are also defined in image specifications 210, and image publishing kit 220 publishes the metadata of each of the different solutions and user components in image depot 120.

The second part of FIG. 2 depicts steps for creating, validating, and applying the desired image. After payloads and metadata of base images, add-ons, firmware components, solutions, and user components have been published in image depot 120, the end user is able to define software specification 105 for the desired image of the virtualization software through UI 101. UI 101 includes different sections for selecting a base image, add-on, solution, firmware package, and one or more user components. Software specification 105 is generated based on the selections the end user makes through UI 101.

After software specification 105 is generated, image manager 112 parses it to determine the selections of the base image, add-on, solution, firmware package, and one or more user components made by the end user. Then, image manager 112 retrieves the metadata corresponding to the selected base image, the selected add-on, and the selected solution from image depot 120, determines the firmware manifest corresponding to the selected firm ware package, and composites an image of the virtualization software as a hierarchical software stack, as described above. Image manager 112 then validates the composited image as described below in conjunction with FIG. 4, and commits the validated composited image of the virtualization software as desired image 125 in shared storage 160.

Figure 3:
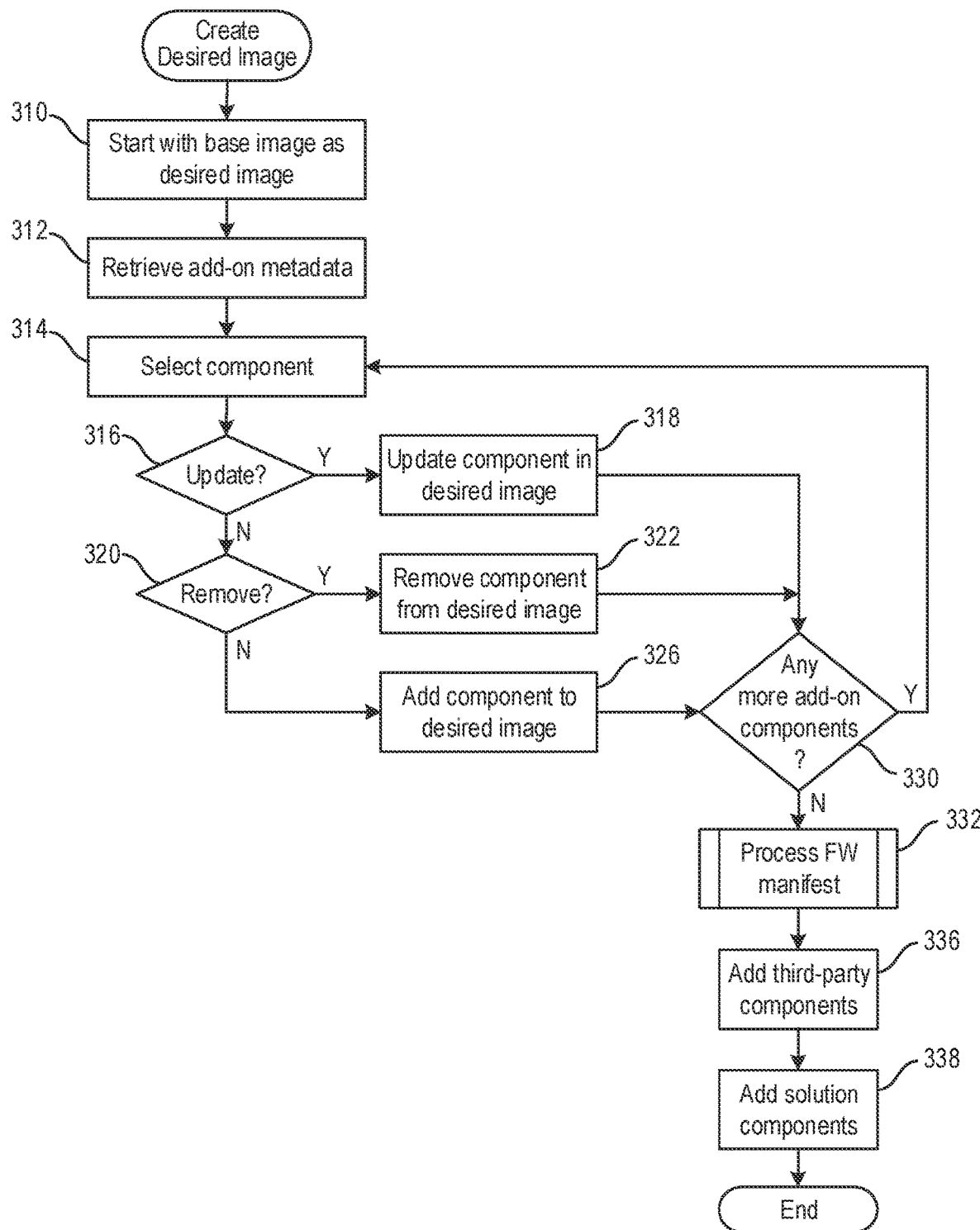
FIG. 3 is a flow diagram of steps carried out to create the desired image of the virtualization software, according to an embodiment.

FIG. 3 is a flow diagram of steps carried out by image manager 112 to create the desired image of the virtualization software, according to an embodiment. The method of FIG. 3 begins at step 310, where image manager 310 starts with the metadata of the selected base image as the desired image. Then, at step 312, image manager 310 retrieves the metadata of the selected add-on and parses the metadata of the selected add-on for components.

At step 314, image manager 112 selects a component to process. If the component is to be updated as determined at step 316, image manager 112 updates the metadata of the component in the desired image at step 318. If the component is to be removed as determined at step 320, image manager 112 removes the metadata of the component from the desired image at step 322. If the component is to be neither updated nor removed, it is added to the desired image at step 326. If there are any more add-on components to process, as determined at step 330, the process returns to step 314, where another component is selected for processing.

If there are no more add-on components to process, as determined at step 330, image manager 112 at step 332 processes the firmware manifest corresponding to the selected firmware package to add and remove components in the same manner as the selected add-on was processed. Then, image manager 112 adds to the desired image and one or more user components selected by the user at step 336 and components for the selected solution at step 338.

FIG. 4 is a flow diagram of steps carried out by image manager 112 to perform validation of the desired image, according to an embodiment. The method of FIG. 4 begins at step 410 at which image manager 112 retrieves metadata of all payloads in the desired image. Then, at step 412, image manager 112 parses the retrieved metadata to extract all dependencies and conflicts defined therein. Image manager 112 executes steps 414 and 416 to determine if any dependencies or conflicts are violated by the payloads that make up the desired image. If there are no such violations, the desired image is committed at step 418 as stored in shared storage 160 as desired image 125. On the other hand, if there is any violation, an error is returned at step 420.

Figure 5:
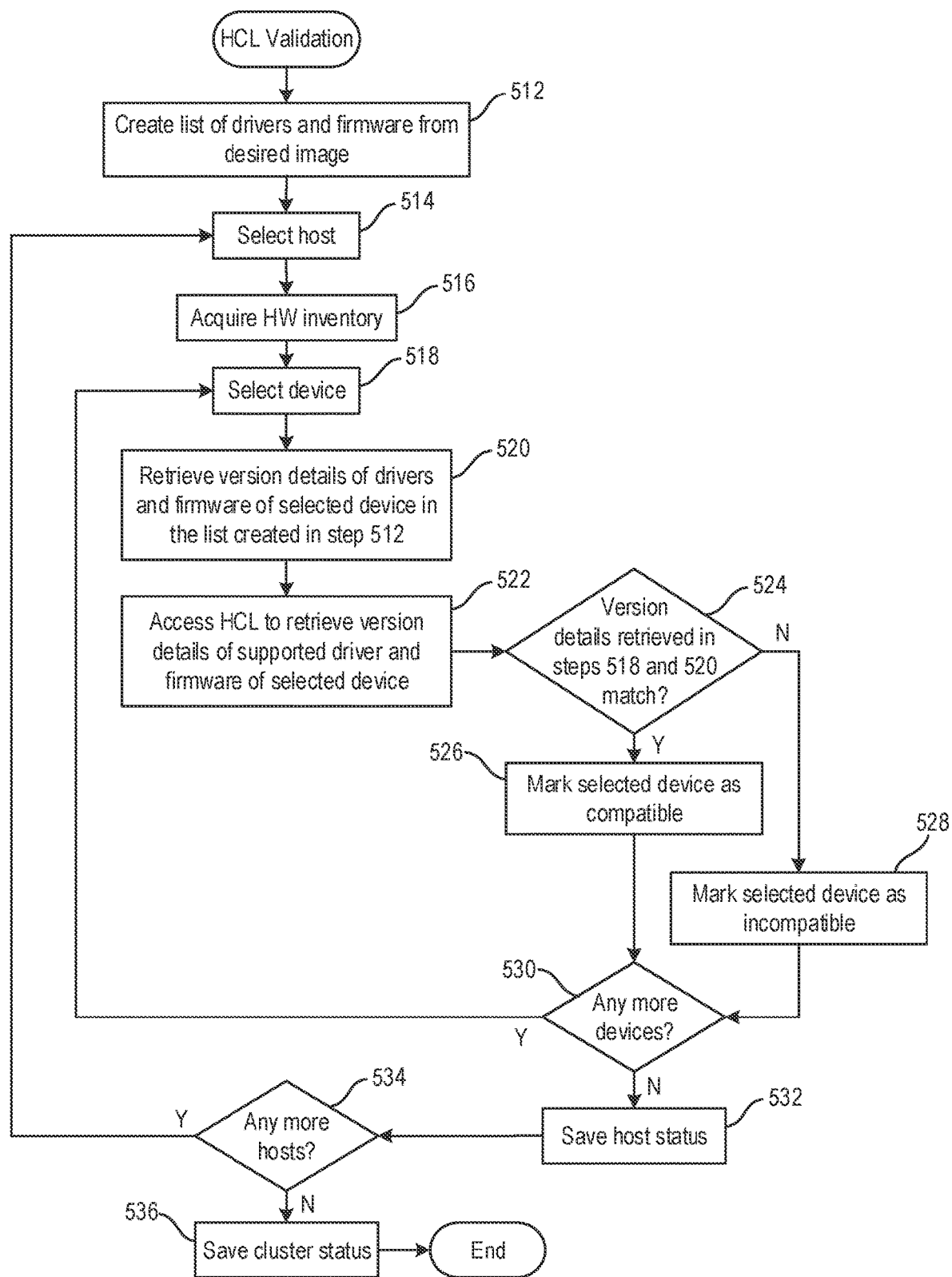
FIG. 5 is a flow diagram of steps carried out to perform validation against a hardware compatibility list, according to an embodiment.

FIG. 5 is a flow diagram of steps carried out by image manager 112 to perform validation of the desired image of the virtualization software against HCL 180, according to an embodiment. The method of FIG. 5 begins at step 512 at which image manager 112 creates a list of firmware and drivers that are in desired image 125, along with their version numbers. At step 514, image manager 112 selects a host against which HCL validation is performed. Steps 516, 518, 520, 522, 524, 526, 528, 530, 532, and 534 are executed each time a new host is selected at step 514.

At step 516, image manager 112 acquires the hardware inventory of the host, e.g., from a hardware discovery service that is running in VM management server 100. Then, at step 518, image manager 112 selects a unique device in the hardware inventory. Steps 520, 522, 524, 526, 528, and 530 are executed each time a new unique device is selected at step 518. At step 520, image manager 112 retrieves version details of drivers and firmware of the selected device in the list created at step 512. Then, at step 522, image manager 112 accesses HCL 180 to retrieve version details of supported driver and firmware of the selected device. The version details of the drivers and firmware retrieved at step 520 and the version details of the drivers and firmware retrieved at step 522 are then compared at step 524, if there is a match, i.e., the version details of the drivers and firmware retrieved at step 520 can be found in the version details of the drivers and firmware retrieved at step 522, the selected device is marked as compatible at step 526. On the other hand, if there is no match, i.e., the version details of the drivers and firmware retrieved at step 520 cannot be found in the version details of the drivers and firmware retrieved at step 522, the selected device is marked as incompatible at step 528.

If it is determined at step 530 that there is another unique device in the hardware inventory, the process returns to step 518, where image manager 112 selects the next unique device in the hardware inventory. If it is determined at step 50 that there is no other unique device in the hardware inventory, the process proceeds to step 532, at which image manager 112 saves the status for the selected host. If any of the devices were marked as incompatible at step 528, the selected host is marked as incompatible at step 532. If all of the devices were marked as compatible at step 528, the selected host is marked as compatible at step 532.

At step 532, if it is determined that HCL validation has not been carried out for all of hosts 131, the process returns to step 514, where image manager 112 selects the next host for HCL validation. If not, the process proceeds to step 536, at which image manager reads the status of all the hosts in the cluster and saves the status for the entire cluster. If any of the hosts of the cluster were marked as incompatible at step 532, the cluster is marked as incompatible at step 536. If all of the hosts of the cluster were marked as compatible at step 532, the cluster is marked as compatible at step 536. After step 536, the process ends.

Figure 6:
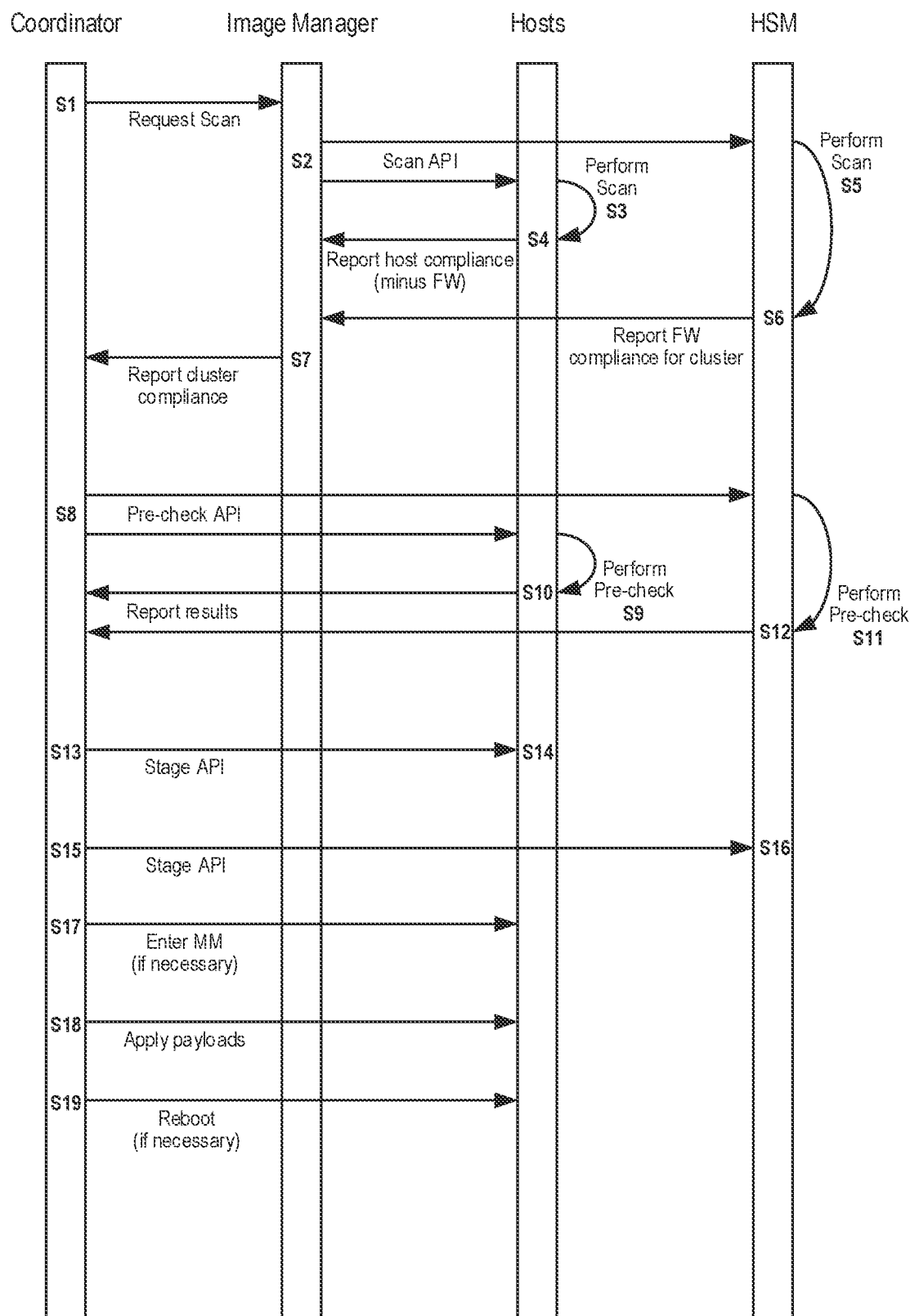
FIG. 6 is a command sequence diagram that depicts a process for applying the desired image of the virtualization software to hosts of the virtualized computing system.

After desired image 125 is validated, committed, and stored in shared storage 160 and after it passes HCL validation, desired image 125 can be applied to hosts 131. Referring back to FIG. 2, image manager 112 transfers control for applying desired image 125 to coordinator 114. The process for applying desired image 125 is depicted in FIG. 6. FIG. 6 is a command sequence diagram that depicts a process for applying the desired image of the virtualization software to hosts of the virtualized computing system. The process includes the following subprocesses: (1) scan, (2) pre-check, (3) stage, and (4) apply.

The scan subprocess is represented by steps S1 to S7. Coordinator 114 initiates the scan subprocess by making the request to image manager 112 at step S1. In response, image manager 112 at step S2 issues a scan API to image manager 152 of each host 131 and a scan API to hardware support manager 170. The scan API includes a storage location of desired image 125.

In response to the scan API, image manager 152 at step S3, accesses desired image 125 and retrieves the current state of the virtualization software from image database 153, and compares the two to determine if each item of desired image 125 other than the firmware manifest is "incompatible" (which means that desired image 125 cannot be applied, e.g., when the current state is running a higher version of an item), "compliant" (which means that the current state matches the desired state), non-compliant (which means that the current state can be upgraded to the desired state), or unknown (which means that a comparison of the current state could not be made with the item in desired image 125 because the item in desired image 125 is unknown or not recognizable). At step S4, image manager 152 of each host 131 sends back a compliance report indicating one of four aforementioned compliance states, and for each item that is non-compliant, also reports on the impact on the host to which desired image 125 will be applied, i.e., whether the host needs to enter into a maintenance mode or needs to be rebooted.

In response to the scan API, hardware support manager 170 at step S5, accesses desired image 125 to extract the firmware manifest in desired image 125, and for each host 131, determines whether or not the firmware specified by the firmware manifest is incompatible, compliant, non-compliant, or unknown with respect to the firmware currently installed in each host 131. At step S6, hardware support manager 170 prepares a firmware compliance report per host, and sends back the firmware compliance report per host to image manager 112. The firmware compliance report per host indicates "incompatible" if the host has installed therein firmware that is of a higher version that that specified by the firmware manifest, "compliant" if the host has installed therein the firmware specified by the firmware manifest, "non-compliant" if the host has installed therein firmware that is of a lower version than that specified by the firmware manifest, or "unknown" if the firmware manifest specifies firmware that is either unknown or not recognizable. If the compliance state is "non-compliant" for any host, the firmware compliance report for that host also indicates the impact on the host, i.e., whether the host needs to enter into a maintenance mode or needs to be rebooted. In cases where hardware support manager 170 supports downgrading of the firmware, the firmware compliance report will indicate "non-compliant" instead of "incompatible" if the host has installed therein firmware that is of a higher version that, that specified by the firmware manifest.

Upon receipt of the compliance reports, image manager 112 prepares a per-host compliance report, based on the compliance report sent from the host at step S4 and a firmware compliance report for the cluster sent from hardware support manager 170 at step S6. Then, image manager 112 generates a cluster level compliance report, based on all of the per-host compliance reports from hosts 131 and the firmware compliance report for the cluster sent from hardware support manager 170. At step S7, image manager 112 sends back both the per-host compliance report (which also indicates the impact on the host), and the cluster level compliance report to coordinator 114.

The pre-check subprocess is represented by steps S8 to S12. Coordinator 114 at step S8 issues a pre-check API to image manager 152 of each host 131 and to hardware support manager 170, In response to the pre-check API, image manager 152 of each host 131 at step S9 accesses desired image 125 and retrieves the current state of the virtualization software from image database 153, and compares the two to determine whether or not the virtualization software in the host is compliant or can be upgraded to desired image 125 at that time, and performs several other checks on the host and at step S10 sends the results of the checks to coordinator 114. The other checks include whether or not the host can enter into maintenance mode at that time and a check on the operational health of the host. Similarly, in response to the pre-check API, hardware support manager 170 at step S11 performs a check on each host 131 to determine whether or not the firmware in the host is compliant or can be upgraded to the firmware specified by the firmware manifest in desired image 125 at that time, and at step S12 sends the results of this check to coordinator 114. A pre-check might fail for firmware if higher versions of firmware are already installed, or if the combination of drivers in the image and the firmware specified by the firmware manifest would be incompatible (e.g. if the end user overrode a component in a way that is incompatible with the firmware specified by the firmware manifest). There may also be hardware-specific reasons the firmware specified by the firmware manifest cannot be applied (e.g., defects in system that need repair, lack of resources for the firmware in baseboard management controller 154, etc.)

Coordinator 114 determines whether or not to proceed with the application of desired image 125 to hosts 131 based on the results of the pre-check. For example, if the operational health of one of the hosts 131 is bad, coordinator 114 will not proceed with the application of desired image 125 to hosts 131. Upon determining to proceed with the application of desired image 125 to hosts 131, coordinator 114 executes the stage subprocess.

The stage subprocess is represented by steps S13 to S16. Coordinator 114 at step S13 issues a stage API to image manager 152 of each host 131, and at step S15 issues a stage API to hardware support manager 170. In response, image manager 152 at step S14 pulls in the payloads of desired image 125 from the storage location of desired image 125 and caches them in local memory or cache of the host. At step S16, hardware support manager 170 pulls in payloads of the firmware specified by the firmware manifest in desired image 125 from firmware repository 171 and caches them in local memory or cache of the host.

After staging the payloads, coordinator 114 at step S17 instructs each host 131 to enter into maintenance mode if the cluster compliance report indicates that the maintenance mode is required to bring hosts 131 into compliance. In response to such an instruction (if issued), hosts 131 enter into maintenance mode.

The apply subprocess follows step S17. This subprocess is represented by S18. At step S18, coordinator 114 issues an apply API to each host 131. This API causes image manager 152 of each host 131 to update the current state of the virtualization software with the payloads of desired image 125 staged at step S14 and the payloads of the firmware staged at step S16. Also, at step S18, image manager 152 updates metadata of the virtualization software that is stored in image database 153 to reflect that the virtualization software in the host and the associated firmware have been updated to be compliant with desired image 125.

At step S19, coordinator 114 instructs each host 131 to reboot if the cluster compliance report indicates that hosts 131 are required to be rebooted to bring the virtualization software in the host and the associated firmware into compliance. In response to such an instruction (if issued), hosts 131 undergo a reboot.

Figure 7:
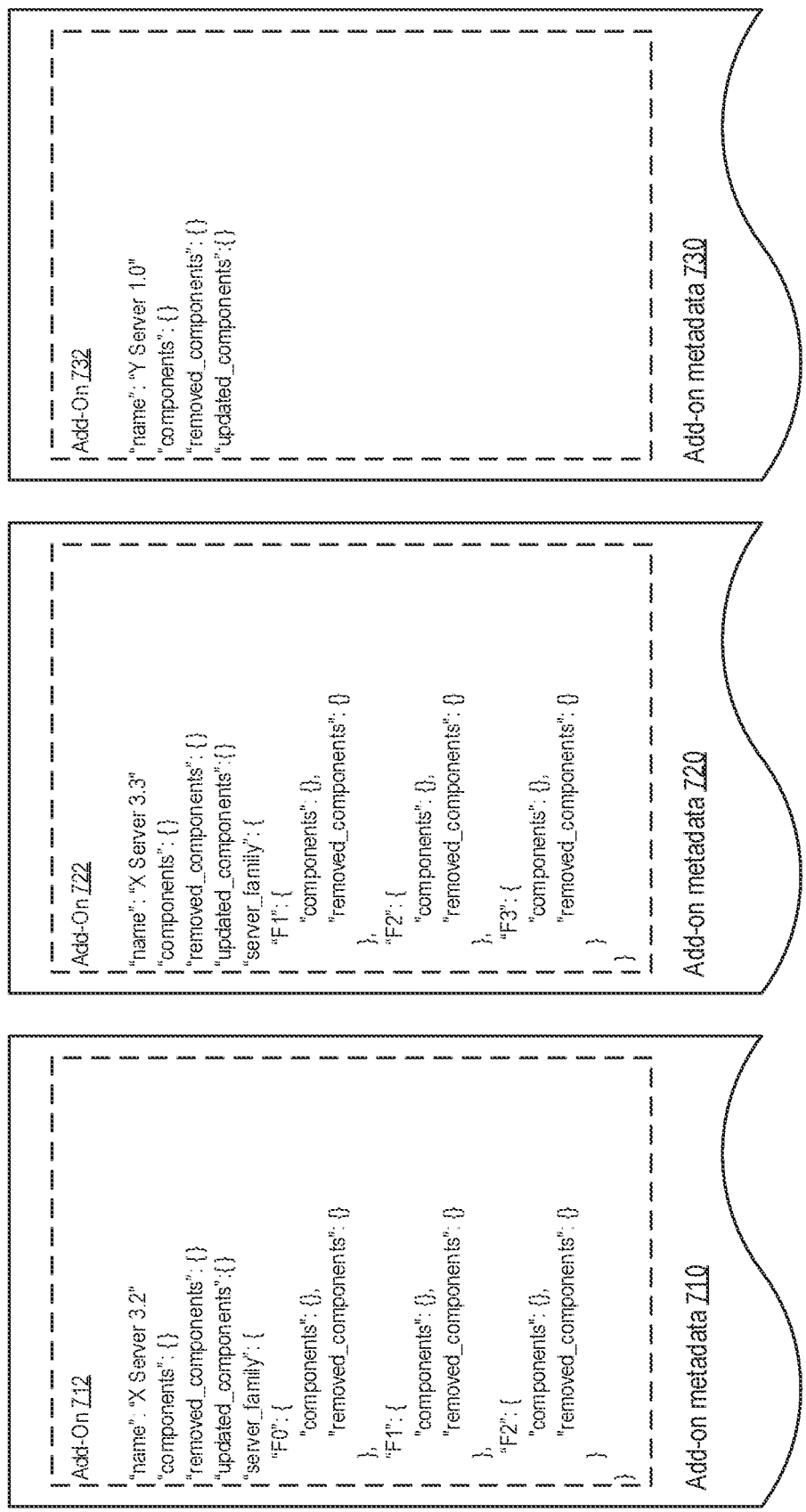
FIG. 7 illustrates two examples of add-on metadata for a heterogeneous cluster of hosts and one example of add-on metadata for a homogeneous cluster of hosts.

FIG. 7 illustrates two examples of add-on metadata 710, 720 for a heterogeneous cluster of hosts and one example of add-on metadata 730 for a homogeneous cluster of hosts. As used herein, a "heterogeneous" cluster of hosts include hosts of at least two different types of server hardware, and a "homogeneous" cluster of hosts include hosts of only one type of server hardware. In addition, server hardware of different types means server hardware platforms, e.g., CPU, system memory, network interface controllers, and storage interface circuits, that are provided by: (1) different vendors (e.g., Dell and HP); (2) same vendor but different models (e.g., Dell PowerEdge T140 and Dell PowerEdge R740); or (3) same vendor and same model, but different generations (e.g., Dell PowerEdge 8740 Gen 13 and Dell PowerEdge 8740 Gen 14). In the description below, the notation for a particular model and generation of server hardware is expressed in the following manner. In the notation "X Server 3.2," "X" identifies the vendor, and "Server 3" identifies the model. The number following the decimal point after the model identifies the generation number, and later generations are identified by higher numbers.

Each of add-on metadata 710, 720, 730 is an example of an add-on metadata retrieved from image depot 120 based on the add-on selection made through UT 101 and specifies the components that are added, deleted, or updated by the selected add-on. When a selected add-on supports different types of server hardware, the corresponding add-on metadata (e.g., add-on metadata 710 or add-on metadata 720) further specifies the components that are added, deleted, or updated by different types of the server hardware. Add-on metadata. 710 is for the "X Server 3.2" server hardware and supports the following three generations of the X Server 3 family: F0 (corresponding to X Server 3.0), F1 (corresponding to X Server 3.1), and F2 (corresponding to X Server 3.2). Add-on metadata 720 is for the "X Server 3.3" server hardware and supports the following three generations of the X Server 3 family, F1 (corresponding to X Server 3.1), F2 (corresponding to X Server 3.2), and F3 (corresponding to X Server 3.3).

Accordingly, in the example given in FIG. 7, add-on metadata 710 supports a heterogeneous cluster of hosts that include any of X Server 3.0, X Server 3.1, and X Server 3.2. However, if such a cluster also included a server hardware that is one or more generations earlier than X Server 3.0 or later than X Server 3.2, add-on metadata 710 would be not be able to support it. Similarly, add-on metadata 720 supports a heterogeneous cluster of hosts that include any of a heterogeneous cluster of hosts that include any of X Server 3.1, X Server 3.2, and X Server 3.3, but if such a cluster also included a server hardware that is one or more generations earlier than X Server 3.1 or later than X Server 3.3, add-on metadata 720 would be not be able to support it.

Figure 8:
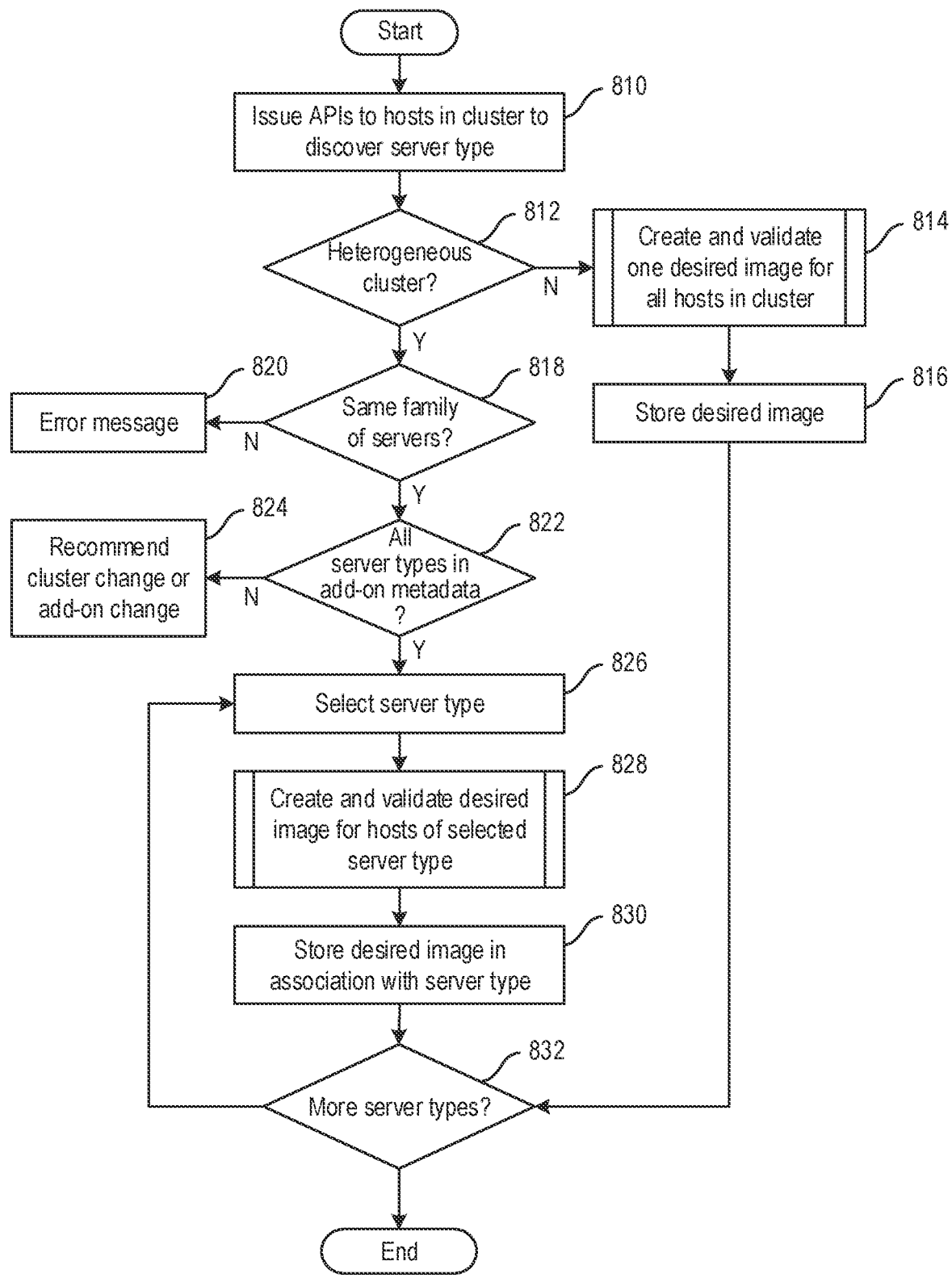
FIG. 8 is a flow diagram of steps carried out to create a plurality of desired images of the virtualization software, each corresponding to a different server hardware type, according to embodiments.

FIG. 8 is a flow diagram of steps carried out to create a plurality of desired images of the virtualization software, each corresponding to a different server hardware type, according to embodiments. The method of FIG. 8 begins at step 810 with image manager 112 issuing an API to each host in a cluster of hosts to discover the server hardware type of the host. Upon receiving a response from all of the hosts, image manager 112 determines at step 812 whether the cluster of hosts is a heterogeneous cluster or a homogeneous cluster. If the cluster is homogeneous, image manager 112 at step 814 executes the processes illustrated in FIGS. 3-5 to create and validate one desired image of the virtualization software for all hosts in the cluster, and at step 816 stores the desired image in shared storage 160, If the duster is heterogeneous, image manager 112 performs additional checks at steps 818 and 822.

Step 818 is a check to see if the different server hardware types are of the same family of servers, e.g., same vendor and same model, but different generations. If the cluster has server hardware from different vendors or of different models, image manager 112 at step 820 generates an error message.

Step 822 is a check to see if the different generations of the server hardware are supported by the add-on metadata corresponding to an add-on image identified in software specification 105. For example, add-on metadata 710 would be able to support a heterogeneous cluster that consists of only X Server 3.0, X Server 3.1, and X Server 3.2, but would be unable to support the cluster if the cluster also included a server hardware that is one or more generations earlier than X Server 3.0 or later than X Server 3.2. Similarly, add-on metadata 720 would be able to support a heterogeneous cluster that consists of only X Server 3.1, X Server 3.2, and X Server 3.3, but would be unable to support the cluster if the cluster also included a server hardware that is one or more generations earlier than X Server 3.1 or later than X Server 3.3. If the different generations of the server hardware are not supported by the add-on metadata, step 824 is executed next.

At step 824, image manager 824 recommends a change in the cluster configuration or a change in the add-on image. The recommended change in the cluster configuration may be carried out by, for example, migrating virtual machines from hosts having server hardware that is not supported to hosts having server hardware that is supported and then removing the unsupported hosts from the cluster. A change in the cluster configuration may not be necessary if there is a later version of the add-on image that supports all the hosts in the heterogeneous cluster, and in such situations, a change in the add-on image would be recommended. For example, if the heterogeneous cluster consists of 8 hosts that are X Server 3.1, 22 hosts that are X Server 3.2, and 2 hosts that are X Server 3.3 and the add-on image identified in software specification 105 is for X Server 3.2, image manager 112 would recommend a change in the add-on image from the add-on image for X Server 3.2 to the add-on image for X Server 3.3.

Steps 826, 828, 830, and 832 are carried out to composite a desired image for each type of server hardware that is supported. Image manager 112 at step 826 selects a supported server hardware type and at step 828 executes the processes illustrated in FIGS. 3-5 to create and validate the desired image of the virtualization software for the selected server hardware type. Then, at step 830, image manager 112 stores each desired image created and validated at step 828 in shared storage 160 in association with the selected server hardware type. When the desired image for all of the server hardware types have been created, validated, and stored (step 832, Yes), the process ends. Otherwise (step 832, No), the method returns to step 826 for another server hardware type to be selected and the desired image for the selected server hardware type to be created, validated, and stored.

Figure 9:
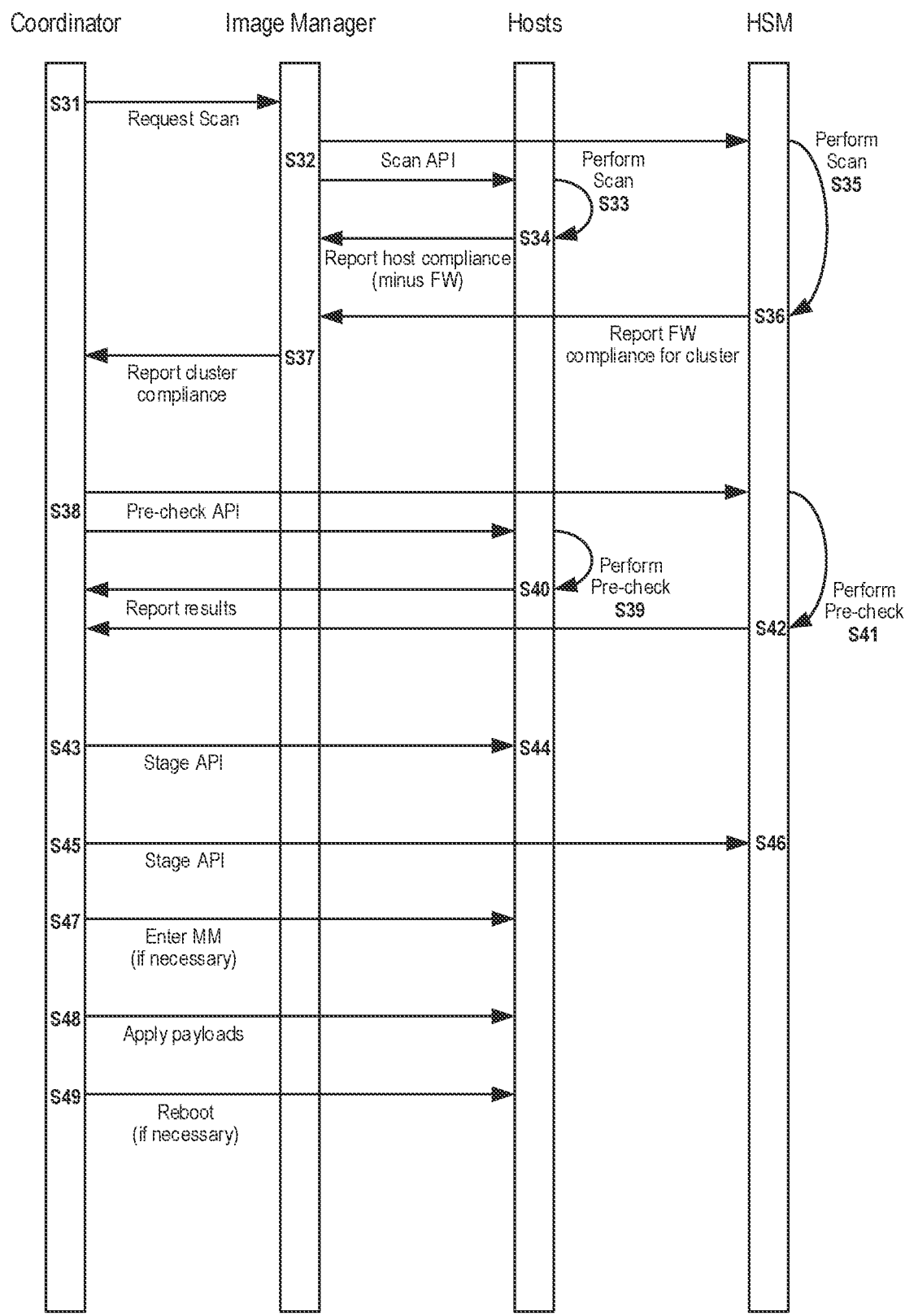
FIG. 9 is a command sequence diagram that depicts a process for applying the desired image of the virtualization software to a heterogeneous cluster of hosts.

After the desired images of the virtualization software for the heterogeneous cluster of hosts are created, validated, and stored in shared storage 160, image manager 112 transfers control for applying the desired images to coordinator 114. The process for applying the desired images is depicted in FIG. 9. FIG. 9 is a command sequence diagram that depicts a process for applying the desired images of the virtualization software to a heterogeneous cluster of hosts according to embodiments. The process includes the following sub-processes: (1) scan, (2) pre-check, (3) stage, and (4) apply.

The scan subprocess is represented by steps S31 to S37. Coordinator 114 initiates the scan subprocess by making the request to image manager 112 at step S31. In response, image manager 112 at step S32 issues a scan API to image manager 152 of each host 131 and a scan API to hardware support manager 170, The scan APT includes a storage location of the desired images in shared storage 160.

In response to the scan API, image manager 152 of each host 131 at step S33, accesses one of the desired images corresponding to its server hardware type from a storage location in shared storage 160 and retrieves the current state of the virtualization software from image database 153, and compares the two to determine if each item of the desired image other than the firmware manifest is "incompatible," "compliant," "non-compliant," or "unknown." At step S34, image manager 152 of each host 131 sends back a compliance report indicating one of four aforementioned compliance states, and for each item that is non-compliant, also reports on the impact on the host to which the desired image will be applied, i.e., whether the host needs to enter into a maintenance mode or needs to be rebooted.

In response to the scan API, hardware support manager 170 at step S35 accesses for each host 131, the desired image for that host (i.e., one of the desired images corresponding to the host's server hardware type) to extract the firmware manifest, and determines whether or not the firmware specified by the firmware manifest is incompatible, compliant, non-compliant or unknown with respect to the firmware currently installed in the host. At step S36, hardware support manager 170 prepares a firmware compliance report, per host, and sends back the firmware compliance report per host to image manager 112. The firmware compliance report per host indicates "incompatible" if the host has installed therein firmware that is of a higher version that that specified by the firmware manifest, "compliant" if the host has installed therein the firmware specified by the firmware manifest, "non-compliant" if the host has installed therein firmware that is of a lower version than that specified by the firmware manifest, or "unknown" if the firmware manifest specifies firmware that is either unknown or not recognizable. If the compliance state is "non-compliant" for any host, the firmware compliance report for that host also indicates the impact on the host, i.e., whether the host needs to enter into a maintenance mode or needs to be rebooted. In cases where hardware support manager 170 supports downgrading of the firmware, the firmware compliance report will indicate "non-compliant" instead of "incompatible" if the host has installed therein firmware that is of a higher version that that specified by the firmware manifest.

Upon receipt of the compliance reports, image manager 112 prepares a per-host compliance report based on the compliance report sent from the host at step S34 and firmware compliance reports sent from hardware support manager 170 at step S36. Then, image manager 112 generates a cluster level compliance report based on all of the per-host compliance reports from hosts 131 and the firmware compliance reports sent from hardware support manager 170. At step S37, image manager 112 sends back both the per-host compliance report (which also indicates the impact on the host), and the cluster level compliance report to coordinator 114.

The pre-check subprocess is represented by steps S38 to S42. Coordinator 114 at step S38 issues a pre-check API to image manager 152 of each host 1311 and to hardware support manager 170. In response to the pre-check API, image manager 152 of each host 131 at step S39 accesses one of the desired images corresponding to its server hardware type from shared storage 160 and retrieves the current state of the virtualization software from image database 153, and compares the two to determine whether or not the virtualization software in the host is compliant or can be upgraded to the desired image at that time, and performs several other checks on the host and at step S40 sends the results of the checks to coordinator 114. The other checks include whether or not the host can enter into maintenance mode at that time and a check on the operational health of the host. Similarly, in response to the pre-check API, hardware support manager 170 at step S41 performs a check on each host 131 to determine whether or not the firmware in the host is compliant or can be upgraded to the firmware specified by the firmware manifest in the desired image for that host (i.e., one of the desired images corresponding to the host's server hardware type) at that time, and at step S42 sends the results of this check to coordinator 114. A pre-check might fail for firmware if higher versions of firmware are already installed, or if the combination of drivers in the image and the firmware specified by the firmware manifest would be incompatible (e.g. if the end user overrode a component in a way that is incompatible with the firmware specified by the firmware manifest). There may also be hardware-specific reasons the firmware specified by the firmware manifest cannot be applied (e.g., defects in system that need repair, lack of resources for the firmware in baseboard management controller 154, etc.)

Coordinator 114 determines whether or not to proceed with the application of the desired images to hosts 131 based on the results of the pre-check. For example, if the operational health of one of the hosts 131 is bad, coordinator 114 will not proceed with the application of the desired images to hosts 131. Upon determining to proceed with the application of the desired images to hosts 131, coordinator 114 executes the stage subprocess.

The stage subprocess is represented by steps S33 to S36. Coordinator 114 at step S43 issues a stage API to image manager 152 of each host 131, and at step S45 issues a stage API to hardware support manager 170. In response, image manager 152 of each host 131 at step S44 pulls in the payloads of the desired image for that host from shared storage 160 and caches them in local memory or cache of that host. At step S46, hardware support manager 170 for each host 131, pulls in payloads of the firmware specified by the firmware manifest in the desired image for that host from firmware repository 171 and caches them in local memory or cache of that host.

After staging the payloads, coordinator 114 at step S47 instructs hosts 131 to enter into maintenance mode if the cluster compliance report indicates that the maintenance mode is required to bring hosts 131 into compliance. In response to such an instruction (if issued), hosts 131 enter into maintenance mode.

The apply subprocess follows step S47. This subprocess is represented by S48. At step S48, coordinator 114 issues an apply API to each host 131. This API causes image manager 152 of each host 131 to update the current state of the virtualization software with the payloads of the desired image staged at step S44 and the payloads of the firmware staged at step S46. Also, at step S48, image manager 152 updates metadata of the virtualization software that is stored in image database 153 to reflect that the virtualization software in the host and the associated firmware have been updated to be compliant with the desired image.

At step S49, coordinator 114 instructs each host 131 to reboot if the cluster compliance report indicates that hosts 131 are required to be rebooted to bring the virtualization software in the host and the associated firmware into compliance. In response to such an instruction (if issued), hosts 131 undergo a reboot.

In the embodiments describe above in conjunction with FIGS. 7-9, the desired images of the virtualization software are created, validated, stored, and applied to a heterogeneous cluster of hosts, in particular to a cluster of hosts of the same server family. In other words, the hosts in the heterogeneous cluster described above have server hardware from the same vendor and of the same model, but of different generations. However, embodiments are not limited to a heterogeneous cluster of hosts of the same server family, but can be applied to a heterogeneous cluster of hosts that have server hardware of different models and even from different vendors.

Further, in the embodiments described above, the end user carries out the processes of FIGS. 6 and 9 to "remediate" the hosts. The remediation process may be executed, in one embodiment, to bring the cluster of hosts back into compliance with the desired state of the virtualization software specified in software specification 105. In another embodiment, the process is carried out to deliver and install a new desired image of the virtualization software that is generated from software specification 105. The processes of FIGS. 6 and 9 each include the scan subprocess, the pre-check subprocess, the stage subprocess, and the apply subprocess, but some of the subprocesses, e.g., the scan subprocess and the pre-check subprocess, may be executed on its own, independently of the processes of FIGS. 6 and 9.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of installing an image of a virtualization software in a heterogenous cluster of hosts, the heterogeneous cluster of hosts including first hosts having server hardware of a first type and at least one second host having server hardware of a second type, said method comprising:
    in response to a user input, generating a software specification that specifies a base image of the virtualization software and an add-on image of the virtualization software;
    retrieving metadata of the base image and metadata of the add-on image;
    generating a first desired image of the virtualization software based on the metadata of the base image and the metadata of the add-on image and a second desired image of the virtualization software, which is different from the first desired image of the virtualization software, based on the metadata of the base image and the metadata of the add-on image, wherein the first desired image is to be applied to one or more of the hosts having server hardware of the first type and the second desired image is to be applied to one or more of the hosts having server hardware of the second type;
    storing the first and second desired images of the virtualization software in a storage location accessible by the hosts, wherein the first desired image of the virtualization software is stored in the storage location in association with the first server hardware type and the second desired image of the virtualization software is stored in the storage location in association with the second server hardware type; and
    instructing each of the first hosts to install the first desired image of the virtualization software therein and each of the at least one second host to install the second desired image of the virtualization software therein, wherein the first hosts retrieve the first desired image of the virtualization software from the storage location to install the first desired image of the virtualization software therein, and the at least one second host retrieves the second desired image of the virtualization software from the storage location to install the second desired image of the virtualization software therein.

2. The method of claim 1, wherein the server hardware of the second type is a later generation of the server hardware of the first type.

3. The method of claim 2, further comprising:
    scanning each host in the heterogeneous cluster of hosts to determine the server hardware type thereof.

4. The method of claim 1, wherein
the metadata of the add-on image includes a common section that specifies components to be added, removed, or updated when generating the first and second desired images, a first section that specifies components to be added, removed, or updated when generating the first desired image but not the second desired image, and a second section that specifies components to be added, removed, or updated when generating the second desired image but not the first desired image.

5. A computer system comprising a management server and a heterogeneous cluster of hosts including first hosts having server hardware of a first type and at least one second host having server hardware of a second type, wherein the management server is programmed to execute a method of installing an image of the virtualization software in the hosts, said method comprising:
in response to a user input, generating a software specification that specifies a base image of the virtualization software and an add-on image of the virtualization software;
retrieving metadata of the base image and metadata of the add-on image;
generating a first desired image of the virtualization software based on the metadata of the base image and the metadata of the add-on image and a second desired image of the virtualization software, which is different from the first desired image of the virtualization software, based on the metadata of the base image and the metadata of the add-on image, wherein the first desired image is to be applied to one or more of the hosts having server hardware of the first type and the second desired image is to be applied to one or more of the hosts having server hardware of the second type;
storing the first and second desired images of the virtualization software in a storage location accessible by the hosts, wherein the first desired image of the virtualization software is stored in the storage location in association with the first server hardware type and the second desired image of the virtualization software is stored in the storage location in association with the second server hardware type; and
instructing each of the first hosts to install the first desired image of the virtualization software therein and each of the at least one second host to install the second desired image of the virtualization software therein, wherein the first hosts retrieve the first desired image of the virtualization software from the storage location to install the first desired image of the virtualization software therein, and the at least one second host retrieves the second desired image of the virtualization software from the storage location to install the second desired image of the virtualization software therein.

6. The computer system of claim 5, wherein the server hardware of the second type is a later generation of the server hardware of the first type.

7. The computer system of claim 6, wherein the method further comprises:
scanning each host in the heterogeneous cluster of hosts to determine the server hardware type thereof.

8. The computer system of claim 5, wherein
the metadata of the add-on image includes a common section that specifies components to be added, removed, or updated when generating the first and second desired images, a first section that specifies components to be added, removed, or updated when generating the first desired image but not the second desired image, and a second section that specifies components to be added, removed, or updated when generating the second desired image but not the first desired image.

9. A non-transitory computer readable medium comprising instructions that are executable in a processor for the processor to carry out a method of installing an image of a virtualization software in a heterogenous cluster of hosts, the heterogeneous cluster of hosts including first hosts having server hardware of a first type and at least one second host having server hardware of a second type, said method comprising:
in response to a user input, generating a software specification that specifies a base image of the virtualization software and an add-on image of the virtualization software;
retrieving metadata of the base image and metadata of the add-on image;
generating a first desired image of the virtualization software based on the metadata of the base image and the metadata of the add-on image and a second desired image of the virtualization software, which is different from the first desired image of the virtualization software, based on the metadata of the base image and the metadata of the add-on image, wherein the first desired image is to be applied to one or more of the hosts having server hardware of the first type and the second desired image is to be applied to one or more of the hosts having server hardware of the second type;
storing the first and second desired images of the virtualization software in a storage location accessible by the hosts, wherein the first desired image of the virtualization software is stored in the storage location in association with the first server hardware type and the second desired image of the virtualization software is stored in the storage location in association with the second server hardware type; and
instructing each of the first hosts to install the first desired image of the virtualization software therein and each of the at least one second host to install the second desired image of the virtualization software therein, wherein the first hosts retrieve the first desired image of the virtualization software from the storage location to install the first desired image of the virtualization software therein, and the at least one second host retrieves the second desired image of the virtualization software from the storage location to install the second desired image of the virtualization software therein.

10. The non-transitory computer readable medium of claim 9, wherein the server hardware of the second type is a later generation of the server hardware of the first type.

11. The non-transitory computer readable medium of claim 10, wherein the method further comprises:
scanning each host in the heterogeneous cluster of hosts to determine the server hardware type thereof.

12. The non-transitory computer readable medium of claim 9, wherein
the Metadata of the add-on image includes a common section that specifies components to be added, removed, or updated when generating the first and second desired images, a first section that specifies components to be added, removed, or updated when generating the first desired image but not the second desired image, and a second section that specifies components to be added, removed, or updated when generating the second desired image hut not the first desired image.

\* \* \* \* \*